Sept. 22, 1925.  
J. JENSEN  
1,554,282  
AGRICULTURAL IMPLEMENT  
Filed March 12, 1925    2 Sheets-Sheet 1

Inventor:  
Jens Jensen  
By *[signature]*  
Attorney

Sept. 22, 1925.　　　　　　　　　　　　　　1,554,282
J. JENSEN
AGRICULTURAL IMPLEMENT
Filed March 12, 1925　　2 Sheets-Sheet 2
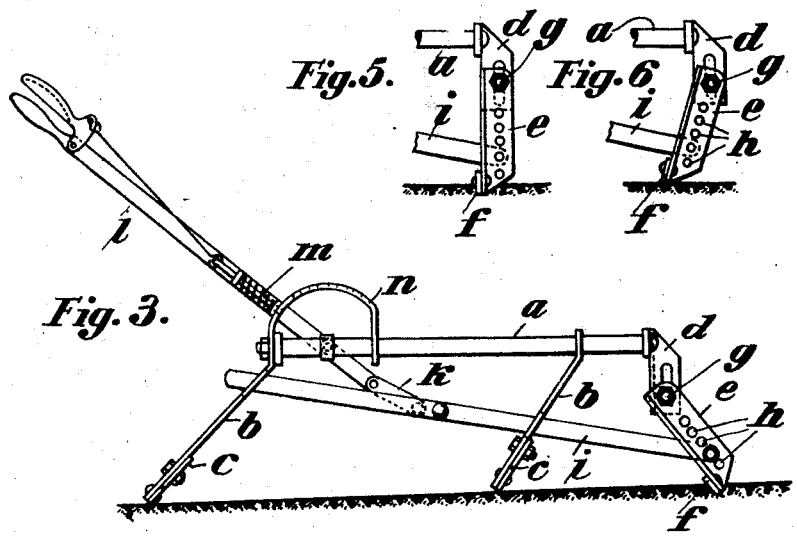
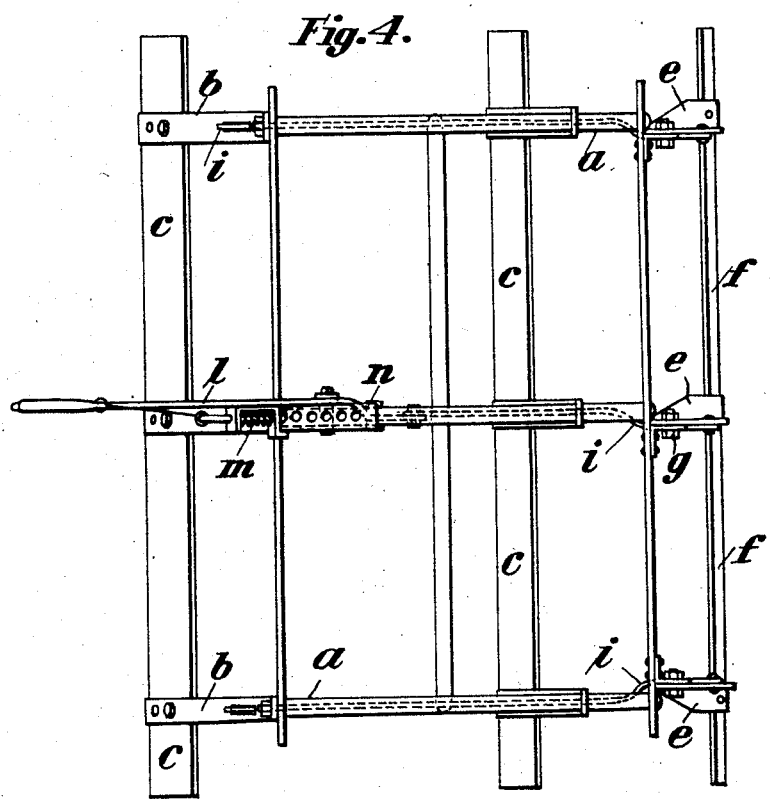
Inventor:
Jens Jensen Patented Sept. 22, 1925.

1,554,282

UNITED STATES PATENT OFFICE.

JENS JENSEN, OF BRODTEN, NEAR TRAVEMUNDE, GERMANY, ASSIGNOR TO GEORG HARDER MASCHINENFABRIK AKTIENGESELLSCHAFT, OF LUBECK, GERMANY.

AGRICULTURAL IMPLEMENT.

Application filed March 12, 1925. Serial No. 15,116.

*To all whom it may concern:*

Be it known that I, JENS JENSEN, a citizen of the Kingdom of Denmark, residing at Brodten, near Travemunde, Germany, have invented certain new and useful Improvements in or Relating to Agricultural Implements, of which the following is a specification.

The present invention relates to an agricultural implement and in particular to a ground leveller.

Devices of this kind are known in which two or more supporting or levelling runners are arranged on a common frame one behind the other and in which the working rail or scraper can be swung and adjusted vertically in relation to the ground. Swinging of the working rail serves the purpose of adapting the device in each instance to the surface of the ground or the purpose of working respectively; that is to say, the operative rail can be adjusted so as to effect a cutting, levelling or scraping action according to local requirements. Changing the horizontal position however effects the proper adjustment as to depth of the working edge of the rail, which depth for instance might have to be greater for a cutting action than for a scraping action.

The object of the invention is to provide an arrangement, which will allow of a simple, quick and safe adjustment of the working rail or scraper for all kinds of ground and irregularities of the surface of the ground to be worked on, even during the working operation. For that purpose the working rail is swung out by means of a positively guided adjusting device in such a manner that its working edge describes a curve, whose centre of curvature travels vertically.

The working rail or scraper can be mounted on one wing of angle bars, whose other wing may be adapted to receive a guiding bolt on the frame of the levelling device and also to serve as a means for connecting the traction device.

In the drawing two forms of the invention are illustrated in which

Figure 1 shows a side elevation and

Figure 2 a partial top view of one form.

Figure 3 is a view in side elevation of the second form.

Figure 4 is a plan of Figure 3.

Figures 5 and 6 show different adjustments of the working rail or runner.

The frame of the levelling device consists of two rails $o$ and $p$ disposed at right angles to the direction of pull, which rails are rigidly connected to one another by a plurality of transverse bolts $r$ provided with distance sleeves $q$. These parts form the frame $a$. Rigidly connected with the said frame are pairs of rearwardly-inclined supporting arms $b$, to the lower ends of which arms supporting or levelling rails $s$ are connected for instance in the form of rollers. At the front end of the frame $a$ a number of vertical hinge members $d$ are arranged, in whose longitudinal slots $t$ are slidable the pins $g$ attached to the complemental hinge members $e$, the latter members carrying the working rail or scraper $f$. $i$ indicates one or more rods linked to the lower hinge members $e$ and guided longitudinally in or on the carrying arms or supports $b$ or other elements of the levelling device. A double armed lever $l$ pivotally mounted at $u$ engages the rod or rods $i$, which lever is adjustably engaged with a toothed sector $n$ attached to the frame, by means of a spring-loaded detent $m$. $v$ indicates one or more pulling hooks for connection to the levelling device.

Figure 1:
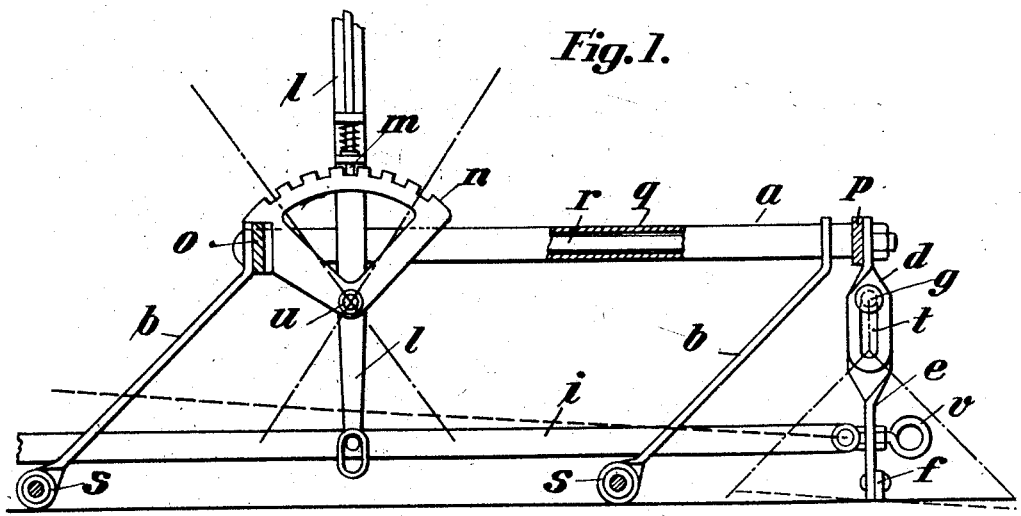
Figure 2:
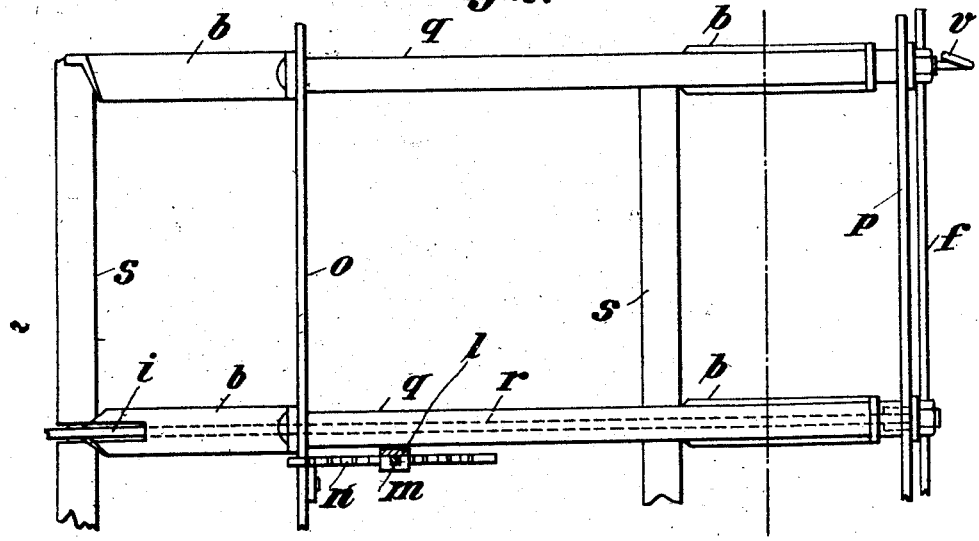

In the example shown the guiding rod $i$ travels endwise in a horizontal plane, but it may likewise be guided in an inclined direction as shown in Figure 1 by a broken line. If it is desired to bring the working rail or scraper $f$ into another angular position relative to the ground, the lever $l$, after releasing the detent $m$, is moved in a forward or backward direction, by which a longitudinal displacement of the rod or rods $i$ is effected. By this operation the scraper rail will not only be swung about the pin $g$ as a center but this latter is positively shifted in the longitudinal slots $t$ into another horizontal position at the same time. Consequently the lower edge of the scraper rail will describe a curve, whose centre of curvature travels vertically.

If the guiding points in the carrying arms or supports $b$ for the rods $i$ are shifted in such a manner that the rods $i$ are in a position angular to the plane of the ground, the scraper rail $f$ following this change in position will now swing with its lower edge angularly to the plane of the ground (see the dotted line in Figure 1). By this method it is possible to force the lower edge of the scraper rail deeper into the ground while swinging forward.

The rods *i* may also be provided with corrugated or cranked lower or upper edges respectively, by which means a corresponding positive wavelike movement of the runner is obtained. The slot and pin guidance may be substituted by any other convenient guidance of similar effect.

In the construction according to Figures 3 to 6 supports *b* are arranged on the frame *a* for the supporting or levelling rails *c* as well as for the guides *d* for the angle bars *e* upon which is mounted the working or scraper rail *f*. The latter is mounted on one of the wings of the angle bar *e* while the other wing is provided with an aperture for the guiding bolt *g* and with openings *h* for connecting the traction device.

There are arranged a number of openings *h* in juxtaposition in order to allow of the traction device being connected at a higher or lower point according to requirements for the purpose of changing the direction of pull. If the connection is effected at a low level less force is exerted and if connected at a higher point a greater force is transmitted to the working rail or scraper *f*.

The angle bars *e* are also adjusted by means of control rods *i*, which are guided in the frame of the levelling device or in the arms *b* of the supporting or levelling rails respectively. The control rods *i* are connected by means of a link *k* to the adjusting lever *l*. which can be clamped in position by means of a detent *m* having an adjusting stirrup *n*. Through the adjusting lever *l* the scraper rail can be swung out into different positions, as shown in Figures 3, 5 and 6.

I claim:

1. In combination with a ground leveller, two supporting or levelling rails, a front working rail or scrapper, and a positively guided adjusting device for swinging said scraper in such a manner that its working edge describes a curve whose centre of curvature will travel vertically.

2. In combination with a ground leveller, two supporting or levelling rails, a front working rail or scraper, a positively guided adjusting device for swinging said scraper in such a manner that its working edge describes a curve whose centre of curvature will travel vertically, and angle bars on one wing whereof said scraper is mounted, the other wing of said bars adapted to have connected thereto a guiding bolt and a pulling device.

3. In combination with a ground leveller, two supporting or levelling rails, a front working rail or scraper, and a positively guided adjusting device for swinging said scraper in such a manner that its working edge describes a curve whose centre of curvature will travel vertically; said adjusting device comprising a control rod guided in the frame of the levelling device, and an adjusting lever for displacing said rod.

In testimony whereof I have affixed my signature.

JENS JENSEN.